Aug. 4, 1942.   T. L. GLYMPH   2,291,891
MORTAR TEMPERER
Filed Feb. 10, 1941
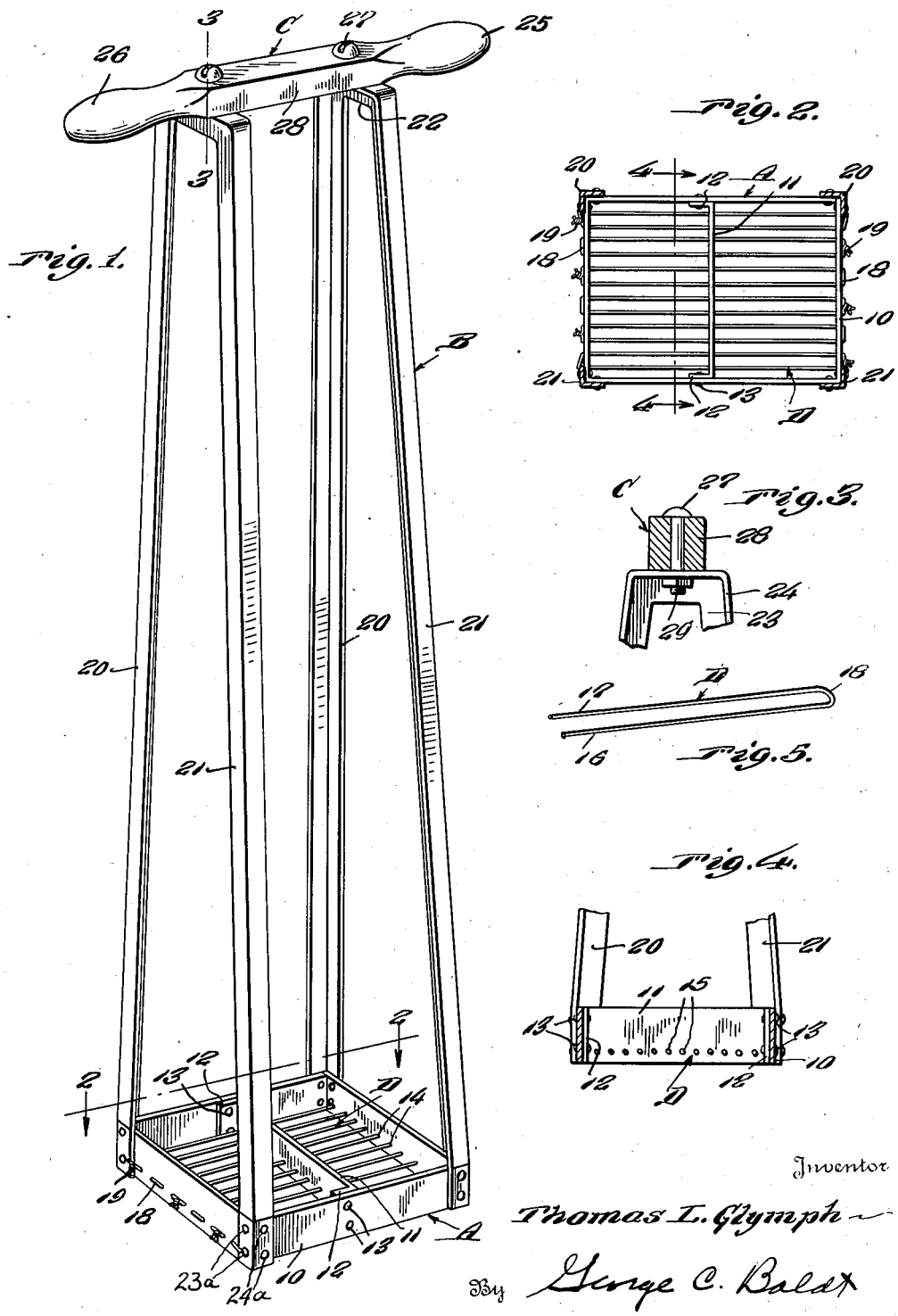
Inventor
Thomas L. Glymph
By George C. Bald
Attorney Patented Aug. 4, 1942

2,291,891

UNITED STATES PATENT OFFICE 2,291,891

MORTAR TEMPERER

Thomas L. Glymph, Asbury Park, N. J.

Application February 10, 1941, Serial No. 378,288

1 Claim. (Cl. 259—178)

This invention relates to a mortar temperer, and particularly to a temperer for use in agitating white mortar, or water slacked lime in plastic condition, prior to the time when it is mixed with the prepared plaster in the gaging operation.

In this connection, it is necessary that the aqueous plastic mass of white mortar, or water slacked lime, be of a uniform density, for otherwise it would be difficult for the plasterer to gage the mass properly when the prepared plaster is added. If the aqueous mass of water slacked lime is lumpy prior to gaging, it is difficult for the plasterer to make a smooth surface on the walls, and moreover, lumpy white mortar will cause discoloration in the walls after the plaster dries. It is, therefore, one of the objects of the present invention to provide an implement that is to be used in agitating and mixing the plastic mass of lime and water in the mixing box, by moving it up and down in the aggregate of water and lime to remove all lumps and segregated particles and bunches of lime to produce a resultant aqueous mass of white mortar for the gaging operation that is of uniform density and free of lumps, soft spots, and bunches of segregated particles of slacked lime.

Another object of the invention is to provide a construction that enables the replacement of certain portions of the agitating, or disintegrating wire on the bottom of the frame, without having to remove the entire length of wire.

A further object of the invention is to design the device of the present invention so as to permit the sides of the frame to be assembled, secured together, and also secured to the standards in one operation.

Another object of the invention resides in the design of the supporting standards in a fashion that permits the use of a single handle that not only furnishes hand grips for the operator, but also serves to maintain the standards in properly spaced relation to prevent the device from warping, buckling, or bending when relatively light weight materials are used in its construction.

With the foregoing and other objects of the invention in view, the invention embodies a novel construction, combination, and arrangement of parts as will be hereinafter more specifically described and illustrated in the accompanying specification and drawing, but it is understood that changes, variations, and modifications may be resorted to without departing from the spirit of the invention defined by the appended claim.

In the drawing wherein like reference characters indicate like parts throughout the several views:

Figure 1 is a perspective view of the device of the present invention.

Figure 2 is a horizontal section taken on the plane of line 2—2 of Figure 1, and looking downwardly.

Figure 3 is a fragmentary detailed vertical section through the handle taken substantially on the plane of line 3—3 of Figure 1, and looking outwardly.

Figure 4 is a fragmentary vertical section taken substantially on the plane of line 4—4 of Figure 2.

Figure 5 is a plan view of one of the crushing or comminuting wire elements prior to incorporating the same in the base of the device, and which is bent to proper shape for threading into the base.

Referring to the drawing in detail, the mortar temperer of the present invention comprises a four-sided horizontally disposed metal frame, or base A. In the form shown, this frame is square. A pair of parallel vertically extending inverted U-shaped standards B rise from and are secured to the base A. A single straight handle C, preferably formed of wood, is anchored to the crown or bight of the standards, so that the opposite ends of the handle extend laterally of the standards to be gripped by the hands of the operator in manipulating the device up and down in the mortar in the mixing box.

The base frame A is formed of the four sides 10 of flat metal, such as strap iron, and the sides are disposed edgewise so that the lower edges cooperate with the wire disintegrating elements in the crushing, comminuting, or disintegrating the lumpy and soft mortar. Midway of the sides, a reinforcing member is added to the base, and this consists of a flat strip 11, of the same material as the sides 10, and on each end of the strip is a flange 12 fitting against the sides and secured at 13, by rivets or bolts. This strip 11 extends at right angles to the handle and at right angles to the crushing or disintegrating elements to be described presently.

The wire crushing or disintegrating elements are formed of 16 gauge wire preferably, and are cut to a predetermined length and bent to a U-shape form D, shown in Figure 5, prior to the threading into the aligned openings 14 in the opposite sides 10, and the aligned openings 15 in the strip 11. When these elements are bent, the one leg 17 of the U-shaped form, is a little longer than the other leg 16, which facilitates the threading of the wire into the aligned openings, and when the U-shaped form is threaded into the openings, the crown or bight 18 overlaps the outside of the sides between adjacent openings 14. The legs 16, 17 are of such a predetermined length that the ends extend beyond the sides, when inserted in the frame, so that they may be grasped by pliers and twisted together at 19. The confronting flanges 23 of the angle iron that overhang the opposite sides 10 at the bottom of each leg of the standards are perforated to register with corresponding openings 14 in the sides to accommodate the outer wire leg of the members D. It is preferred to reverse the position of the succeeding members D, so that on one side there will be a twist 19 and a bight 18 in succession throughout the length of each of the corresponding sides. It will thus be seen that when several of the wire forms D are threaded through and secured across opposite sides 10 and through the reinforcing strip 11, the legs 16 and 17 forming parallel wires that lie in a plane slightly above the lowermost edges of the sides and which wires crush or disintegrate the lumpy and soft mortar. By making the wire into U-shaped elements D, a pair of wires may be removed and replaced without having to disturb the balance.

Each of the pair of standards B are formed in the same manner and a description of one will explain the construction of the other. The standards are formed of angle iron having flanges 23—24 directed inwardly as shown. Each standard is bent into U-shaped form with the legs 20, 21 extending downwardly and the crown 22 extending horizontally. The lower end of each leg of each standard, being of angular form, embraces a corner of the frame, and the one leg 23 of the angle iron is secured to one side 10, as by rivets 23a, while the other leg 24 of the angle, is secured to the other side that forms the corner, as by riveting 24a. Thus, the lower ends of the standards, and the sides 10, are anchored to the frame, and the sides of the frame are secured together in the one fastening operation during the assembly.

It is pointed out that the crowns 22 of the standards B are straight, with the flanges 23 of the crowns disposed in the same plane in spaced relation. The elongated straight wooden handle C bridges the crowns 22 of the standards and has extended portions 25, 26 projecting laterally of the crowns to be gripped by the hands of the operator. An intermediate portion 28 of the handle has a flat lower face bearing on the flanges 23 of the crown portions 22 of the standards. A bolt 27, one for each crown, extends through registering openings in the intermediate portion 28 and the flanges 23, and a nut 29 on the lower end of the bolt bears against the inside of the flanges thereby securing the handle C to the crowns 22 of the standards B. The handle member C is positioned in a manner to be parallel with respect to the crushing or disintegrating wires, and the hand grips lie laterally of the base frame. The handle member C bridging the tops of the standards, maintains the standards in properly spaced relation, and prevents warping or bending in the device when light weight members are used in its construction.

I claim:

A mortar temperer comprising an open four-sided horizontally disposed base frame including corners, the sides of the frame being formed of separate vertically arranged flat pieces disposed edgewise to provide crushing portions on their lower edges, the opposite sides of the frame having aligned openings adjacent their lower edges, a plurality of horizontally disposed U-shaped wires having the legs extending through the aligned openings in the opposite sides, said legs of the U-shaped wires being of a length to extend beyond the sides when threaded through said openings, the length of the legs extended beyond the sides being twisted together against the confronting side to secure said wires to the frame, and the crowns of the U-shaped wires bridging the confronting sides between adjacent openings, a pair of corresponding vertically disposed inverted U-shaped standards of angular cross-section having the branches of the angle directed inwardly, one leg of each standard having the branches of the angle embracing a corresponding corner of the frame, means on each branch of said angle securing the corresponding side to the corresponding leg of the standard, whereby the pieces of the base frame and standards are coupled together in one fastening operation, the crowns of the U-shaped standards being substantially straight and the corresponding branches of the angle in the crowns being disposed in substantially the same horizontal plane, and a horizontally disposed straight handle extending across the crowns of the standards having a flat face secured to said corresponding branches constituting a spacing brace for the standards, said handle having the ends extending outwardly of the crowns of the standards to provide handgrips for manipulating the temperer up and down in the mortar.

THOMAS L. GLYMPH.